(12) United States Patent
Wang et al.

(10) Patent No.: US 10,981,244 B2
(45) Date of Patent: Apr. 20, 2021

(54) RESISTANCE WELDING ELECTRODE

(71) Applicant: GM GLOBAL TECHNOLOGY OPERATIONS LLC, Detroit, MI (US)

(72) Inventors: Hui-ping Wang, Troy, MI (US); David R. Sigler, Shelby Township, MI (US); Blair E. Carlson, Ann Arbor, MI (US); Amberlee S. Haselhuhn, Troy, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 16/181,809

(22) Filed: Nov. 6, 2018

(65) Prior Publication Data

US 2019/0076955 A1 Mar. 14, 2019

Related U.S. Application Data

(63) Continuation-in-part of application No. 15/470,062, filed on Mar. 27, 2017, now Pat. No. 10,500,679.
(Continued)

(51) Int. Cl.
*B23K 11/30* (2006.01)
*B23K 11/11* (2006.01)
(Continued)

(52) U.S. Cl.
CPC ......... *B23K 11/3009* (2013.01); *B23K 11/115* (2013.01); *B23K 11/16* (2013.01);
(Continued)

(58) Field of Classification Search
CPC ... B23K 11/3009; B23K 11/115; B23K 11/20; B23K 2101/006; B23K 11/16;
(Continued)

(56) References Cited

U.S. PATENT DOCUMENTS 5,155,320 A 10/1992 Simmons
5,783,794 A 7/1998 Oikawa et al.
(Continued)

FOREIGN PATENT DOCUMENTS

JP 08025058 A * 1/1996
JP 11342477 12/1999

OTHER PUBLICATIONS

Machine translation of Japan Patent No. 08-025,058 A, published Oct. 2020.*
(Continued)

*Primary Examiner* — Geoffrey S Evans

(57) ABSTRACT

A welding electrode includes a weld face that has a convex base weld face surface and a plurality of ringed ridges that are radially spaced apart on the base weld face surface and surround a central weld face axis. The plurality of ringed ridges including an innermost ringed ridge and an outermost ringed ridge. The innermost ringed ridge is located closest to the central weld face axis and rises above a central portion of the base weld face surface, and the outermost ringed ridge is located farthest from the central weld face axis and rises above an outer peripheral portion of the base weld face surface. At least one of the plurality of ringed ridges is a discontinuous ringed ridge.

15 Claims, 3 Drawing Sheets

Related U.S. Application Data

(60) Provisional application No. 62/315,055, filed on Mar. 30, 2016.

(51) Int. Cl.
  *B23K 11/20* (2006.01)
  *B23K 11/16* (2006.01)
  *B23K 11/18* (2006.01)
  B23K 103/20 (2006.01)
  B23K 101/00 (2006.01)
  B23K 103/04 (2006.01)
  B23K 101/18 (2006.01)

(52) U.S. Cl.
  CPC ............ *B23K 11/185* (2013.01); *B23K 11/20* (2013.01); *B23K 2101/006* (2018.08); *B23K 2101/18* (2018.08); *B23K 2103/04* (2018.08); *B23K 2103/20* (2018.08)

(58) Field of Classification Search
  CPC .............. B23K 11/185; B23K 2101/18; B23K 2103/04; B32K 2103/20
  See application file for complete search history.

(56) References Cited

U.S. PATENT DOCUMENTS

| | | | |
|---|---|---|---|
| 6,037,559 | A | 3/2000 | Okabe et al. |
| 7,850,059 | B2 | 12/2010 | Kobayashi et al. |
| 7,935,908 | B2 | 5/2011 | Nakagawa et al. |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,222,560 | B2 | 7/2012 | Sigler et al. |
| 8,436,269 | B2 | 5/2013 | Sigler et al. |
| 8,487,206 | B2 | 7/2013 | Urushihara et al. |
| 8,525,066 | B2 | 9/2013 | Sigler et al. |
| 8,833,215 | B2 | 9/2014 | Sigler et al. |
| 8,927,894 | B2 | 1/2015 | Sigler et al. |
| 9,346,118 | B2 | 5/2016 | Sigler et al. |
| 9,682,439 | B2 | 6/2017 | Sigler et al. |
| 2005/0247679 | A1 | 11/2005 | Wang |
| 2009/0255908 | A1 | 10/2009 | Sigler et al. |
| 2013/0189023 | A1 | 7/2013 | Spinella |
| 2013/0200048 | A1* | 8/2013 | Sigler ............... C22C 21/00 219/117.1 |
| 2013/0263638 | A1 | 10/2013 | Gugel et al. |
| 2013/0306604 | A1 | 11/2013 | Sigler et al. |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Yang et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1 | 6/2017 | Yang et al. |
| 2017/0225262 | A1 | 8/2017 | Sigler et al. |
| 2017/0225263 | A1 | 8/2017 | Sigler et al. |
| 2017/0252853 | A1 | 9/2017 | Wang et al. |
| 2017/0297135 | A1 | 10/2017 | Sigler et al. |
| 2017/0304925 | A1 | 10/2017 | Sigler et al. |
| 2017/0361392 | A1 | 12/2017 | Sigler et al. |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

* cited by examiner

RESISTANCE WELDING ELECTRODE

CROSS-REFERENCE TO RELATED APPLICATION(S)

This application is a continuation-in-part of U.S. Ser. No. 15/470,062, which was filed on Mar. 27, 2017 and is now U.S. Pat. No. 10,500,679, which in turn claims the benefit of U.S. Provisional Application No. 62/315,055, which was filed on Mar. 30, 2016. The entire contents of the aforementioned parent and provisional applications are hereby incorporated by reference.

INTRODUCTION

U.S. Pub. No. 2017/0282303 ("the '303 publication") discloses a welding electrode that includes a radially-slotted weld face. The radially-slotted weld face has a central upstanding plateau that is surrounded by a plurality of circumferentially spaced trapezoidal weld face sections that include transverse upstanding arcuate ridges. The welding electrode disclosed the '303 publication is described in the context of resistance spot welding workpiece stack-ups that include a steel workpiece and an aluminum workpiece that are adhesively bonded together. In particular, the radially-slotted weld face aids in compressing and expelling adhesive material laterally away from the weld site in an effort to limit the inclusion of residual adhesive materials in the weld joint. The welding electrode disclosed in the present application is similar in design to the welding electrode disclosed in the '303 publication although it is not necessarily constructed to have the same functional capacity to expel adhesive material from the weld site. As will be further described below, the presently disclosed welding electrode can be used in a wide range of spot welding applications including, for example, the spot welding of a stack of overlapping aluminum workpieces and the spot welding of a stack of workpieces that includes at least a steel workpiece and an adjacent overlapping aluminum workpiece.

SUMMARY OF THE DISCLOSURE

A welding electrode according to one embodiment of the present disclosure includes a body and a weld face disposed at one end of the body. The weld face includes a convex base weld face surface that rises upwardly along a central weld face axis and a plurality of ringed ridges that are radially spaced apart on the base weld face surface and surround the central weld face axis. The plurality of ringed ridges includes an innermost ringed ridge and an outermost ringed ridge. The innermost ringed ridge is located closest to the central weld face axis and rises above a central portion of the base weld face surface, and the outermost ringed ridge is located farthest from the central weld face axis and rises above an outer peripheral portion of the base weld face surface. Additionally, at least two of the plurality of ringed ridges that are located radially adjacent to one another are discontinuous ringed ridges. Each of the discontinuous ringed ridges comprises a plurality of circumferentially spaced apart arcuate ridge portions that extend along a circular base line of the ridge and rise upwardly from the base weld face surface. The circumferentially spaced apart arcuate ridge portions of each of the discontinuous ringed ridges define two or more ridge gaps along the circular base line of each discontinuous ringed ridge. The two or more ridge gaps defined in each of the discontinuous ringed ridges, in turn, are aligned with the two or more ridge gaps defined in the other of the discontinuous ringed ridges to provide two or more radial channels that traverse the discontinuous ringed ridges.

The welding electrode of the aforementioned embodiment may be further defined. For example, the outermost ringed ridge and a ringed ridge located radially inwardly adjacent to the outermost ringed ridge may be discontinuous ringed ridges. As another example, all of the plurality of ringed ridges included on the weld face may be discontinuous ringed ridges, and each of the two or more radial channels provided by the aligned ridge gaps of the plurality of discontinuous ringed ridges may communicate with the central portion of the base weld face surface and the outer peripheral portion of the base weld face surface. The arcuate ridge portions of the plurality of discontinuous ringed ridges define ridge gaps that provide each of the two or more radial channels with a constant width. The arcuate ridge portions of each of the discontinuous ringed ridges may also define three to six ridge gaps that are aligned to provide three to six radial channels. Still further, the plurality of discontinuous ringed ridges may have from two to ten discontinuous ringed ridges or from three to six discontinuous ringed ridges. The ridge portions of each of the discontinuous ringed ridges may have ridge heights that range from 20 μm to 400 μm. Each of the plurality of ringed ridges may also be separated from its adjacent ringed ridge(s) by a distance of 50 μm to 1800 μm.

In one particular implementation, the plurality of ringed ridges may include at least one continuous ringed ridge in addition to the at least two discontinuous ringed ridges, with each of the at least one continuous ringed ridge rising upwardly from the base weld face surface and being uninterrupted along its circumference. Moreover, the arcuate ridge portions of the plurality of discontinuous ringed ridges may define ridge gaps that provide each of the two or more radial channels with an increasing width towards the outer peripheral portion of the base weld face surface. The two or more radial channels with an increasing width towards the outer peripheral portion of the base weld face surface may be semicircular. The continuous ringed ridge(s) may be located on the base weld face surface radially inside of the plurality of discontinuous ringed ridges. Still further, the radial channels with an increasing width towards the outer peripheral portion of the base weld face surface may include two radial channels open to the peripheral portion of the base weld face surface. The two semicircular radial channels may be diametrically opposed to each other.

A welding electrode according to another embodiment of the present disclosure includes a body and a weld face disposed at one end of the body. The weld face includes a convex base weld face surface that rises upwardly along a central weld face axis and a plurality of ringed ridges that are radially spaced apart on the base weld face surface and surround the central weld face axis. The plurality of ringed ridges includes an innermost ringed ridge and an outermost ringed ridge. The innermost ringed ridge is located closest to the central weld face axis and rising above a central portion of the base weld face surface, and the outermost ringed ridge is located farthest from the central weld face axis and rises above an outer peripheral portion of the base weld face surface. At least one of the plurality of ringed ridges is a discontinuous ringed ridge that has a plurality of arcuate ridge portions that define one or more circumferentially spaced apart ridge gaps.

DETAILED DESCRIPTION

Figure 1:
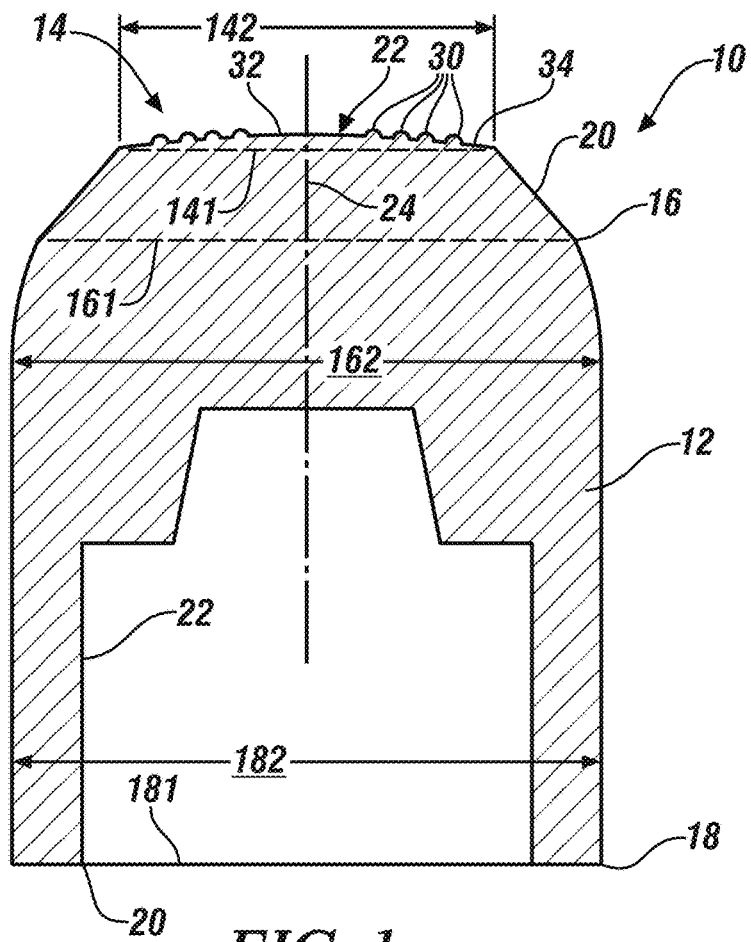
FIG. 1 is an elevated cross-sectional view of a welding electrode according to one embodiment of the present disclosure.
Figure 2:
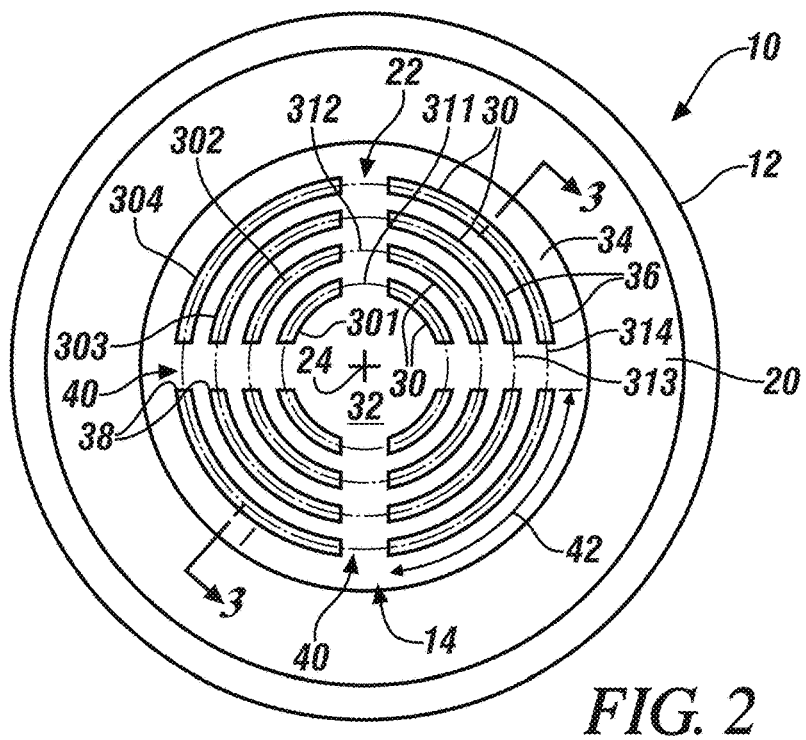
FIG. 2 is a plan view of the weld face of the welding electrode illustrated in FIG. 1 according to one embodiment of the present disclosure.
Figure 3:
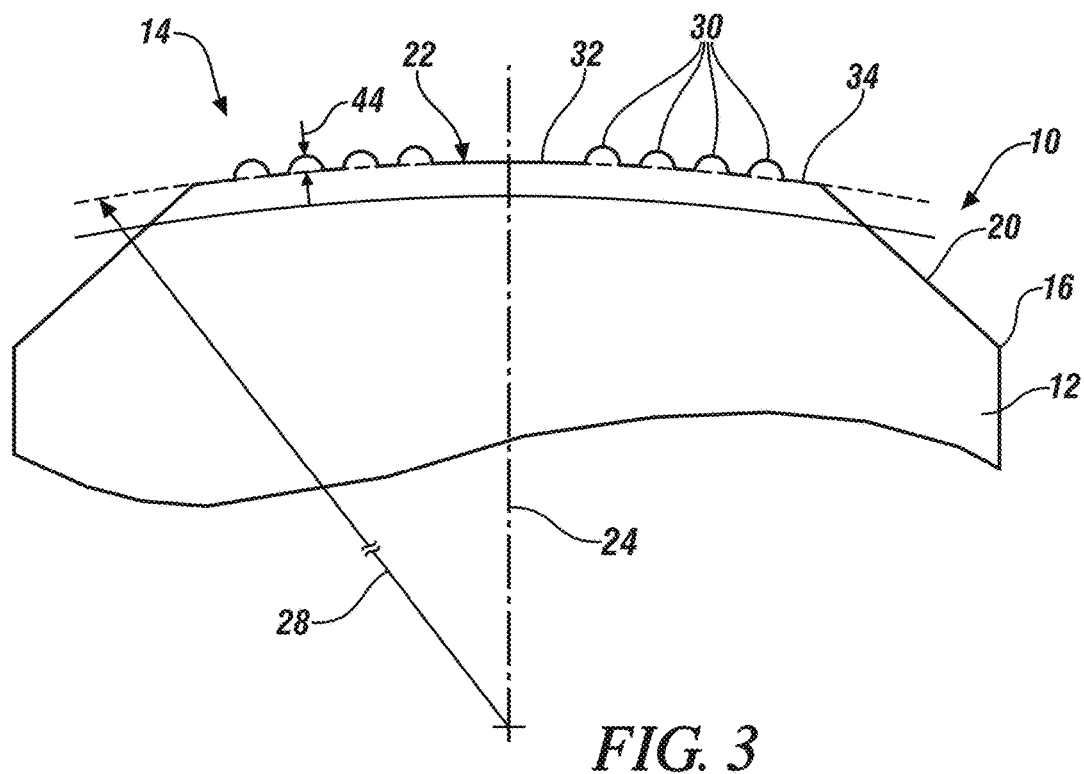
FIG. 3 is a cross-sectional view of the weld face illustrated in FIG. 2 taken along section line 3-3.

The present disclosure pertains to the design of a welding electrode that may be used in conjunction with another, opposed welding electrode to conduct resistance spot welding on a variety of workpiece stack-ups including, for instance, a stack-up of two or more aluminum workpieces and a stack-up of metal workpieces that includes a steel workpiece and an adjacent aluminum workpiece. Referring now to FIGS. 1-3, a welding electrode 10 according to one embodiment of the present disclosure is illustrated. The welding electrode 10 includes an electrode body 12 and a weld face 14. The electrode body 12 is preferably cylindrical in shape and includes a front-end 16 having a circumference 161 and a back-end 18 having a circumference 181. The front-end 16 of the electrode body 12 presents and supports the weld face 14 and the back-end 18 facilitates mounting of the electrode 10 to a weld gun. A diameter 162 of the electrode body 12 at its front-end circumference 161 preferably lies within the range of 12 mm to 22 mm or, more narrowly, within the range of 16 mm to 20 mm, and a diameter 182 at the back-end circumference 181 is typically the same as that of the front-end 16. As shown generally here in FIG. 1, the back-end 18 of the electrode body 12 defines an opening 20 to an internal recess 22 for the insertion of, and attachment with, an electrode mounting device such as a shank adapter The weld face 14 is disposed on the front-end 16 of the electrode body 12 and has a circumference 141 that is coincident with the circumference 161 of the front-end 12 of the body 12 (a "full face electrode") or is upwardly displaced from the circumference 161 of the front-end 16, to a distance between 2 mm and 10 mm, by a transition nose 20 of frustoconical or truncated spherical shape. If the transition nose 20 is frustoconical, the angle of truncation is preferably between 15° and 40° from a horizontal plane of the weld face circumference 141. If the transition nose 20 is spherical, the radius of curvature of the transition nose 20 preferably ranges between 6 mm and 20 mm or, more narrowly, between 8 mm and 12 mm. If a transition nose 20 is present, the circumferences 161, 141 of the front-end 16 of the electrode body 12 and the weld face 14 may be parallel, as shown here, or they may be offset such that the circumference 141 of the weld face 14 is tilted relative to the circumference 161 of the front-end 16 of the electrode body 12. The weld face 14 has a diameter 142 at its circumference 141 (i.e., a planar reach) that ranges from 6 mm to 20 mm or, more narrowly, from 8 mm to 15 mm.

The weld face 14 includes a convex base weld face surface 22 that rises upwardly from the weld face circumference 141 along a central weld face axis 24, as shown best in FIGS. 2-3. The convex base weld face surface 22 may, for example, have a truncated spherical profile with a radius of curvature 28 that ranges from 15 mm to 300 mm or, more narrowly, from 20 mm to 50 mm. The central weld face axis 24 may be coincident with a central axis 26 of the electrode body 12, but it does not necessarily have to be such as when the circumferences 161, 141 of the front-end 16 of the electrode body 12 and the weld face 14 are tilted relative to one another. Additionally, the weld face 14 includes a plurality of ringed ridges 30 that are radially spaced apart on the base weld face surface 22 and surround the central weld face axis 24. The plurality of ringed ridges 30 may include anywhere from two to ten ringed ridges 30 or, more narrowly, anywhere from three to six ringed ridges 30, and is located on the weld face 14 between a central portion 32 of the base weld face surface 22 and an outer peripheral portion 34 of the base weld face surface 22.

The plurality of ringed ridges 30 includes an innermost ringed ridge 301, an outermost ringed ridge 304, and optionally one or more intervening ringed ridges positioned between the innermost and outermost ringed ridges 301, 304. Here, two intervening ringed ridges 302, 303 are shown, although it should be appreciated that in other embodiments there may be more than two intervening ringed ridges or no intervening ringed ridges at all. The innermost ringed ridge 301 is located closest to the central weld face axis 24 and rises above the entirety of the central portion 32 of the base weld face surface 22. The central portion 32 of the base weld face surface 22, as alluded to above, is the full portion of the base weld face surface 22 located radially inboard of the innermost ringed ridge 301, and has a plan diameter (i.e., a planar reach) that ranges from 1.5 mm to 7 mm or, more narrowly, from 2 mm to 5 mm. The outermost ringed ridge 304 is located farthest from the central weld face axis 24 and rises above the outer peripheral portion 34 of the base weld face surface 22. The peripheral portion 34 of the base weld face surface 22 is the entire portion of the base weld face surface 22 located radially outboard of the outermost ringed ridge 304.

Referring now specifically to FIG. 2, at least one of the plurality of ringed ridges 30 is a discontinuous ringed ridge. Ideally, though, at least two of the plurality of ringed ridges 30 that are located radially adjacent to one another are discontinuous ringed ridges. For instance, as shown here in FIG. 2, all of the plurality of ringed ridges 30—that is, the innermost ringed ridge 301, the outermost ringed ridge 304, and each of the intervening ringed ridges 302, 303—may be discontinuous ringed ridges. In other embodiments, however, the plurality of ringed ridges 30 may include at least one continuous ringed ridge, which is a ridge that rises upwardly from the base weld face surface 22 and is uninterrupted in height along its circumference such that it does not constitute a discontinuous ringed ridge, in addition to the at least two adjacent discontinuous ringed ridges. For example, the outermost ringed ridge 304 and the ringed ridge located radially inwardly adjacent to the outermost ringed ridge 304 (ridge 303 in FIG. 3) may be discontinuous while one or both of the other ringed ridges (ridges 301 and 302 in FIG. 3) may be continuous, as is shown in the embodiment illustrated in FIG. 6, which is discussed in more detail below. In the following discussion, the structure and function of the discontinuous ridges are described in the context of the weld face 14 shown in FIG. 3, in which all of the plurality of ringed ridges 30 are discontinuous, and it should be understood that the same description of the discontinuous ringed ridges applies to other embodiments in which less than all of the plurality or ringed ridges are discontinuous.

Each of the discontinuous ringed ridges 301, 302, 303, 304 on the weld face 14 comprises a plurality of circumferentially spaced apart arcuate ridge portions 36 that extend along a circular base line 311, 312, 313, 314 of the ridge 301, 302, 303, 304 and rise upwardly from the base weld face surface 22. The circumferentially spaced apart arcuate ridge portions 36 of each discontinuous ringed ridge 301, 302, 303, 304 define one or more, and preferably two or more, circumferentially spaced apart ridge gaps 38 along the circular base line 311, 312, 313, 314 of each ridge 301, 302, 303, 304. The ridge gaps 38 are circumferential interruptions in height along the circular base line 311, 312, 313, 314 of the ridges 301, 302, 303, 304 relative to the arcuate ridge portions 36. For example, one or more of the ridge gaps 38 may extend all the way down to or even below the convex base weld face surface 22. In another implementation, one or more of the ridge gaps 38 may simply be a depression or dent in an otherwise continuous ringed ridge with the depressed portion of the ridge having a height that is less than 50% of the heights of the adjacent arcuate ridge portions 36.

In a preferred embodiment, the one or more ridge gaps 38 defined in each of the discontinuous ringed ridges 301, 302, 303, 304 are aligned with the one or more ridge gaps 38 defined in each of the other discontinuous ringed ridges 301, 302, 303, 304 to provide one or more corresponding radial channels 40 that traverse the discontinuous ringed ridges 301, 302, 303, 304. Each of the one or more radial channels 40 may extend between and communicate with the central portion 32 of the base weld face surface 22 and the outer peripheral portion 34 of the base weld face surface 22, as shown here, but in other embodiments may extend to only one of those portions 32, 34 of the base weld face surface 22 or neither of those portions 32, 34. The one or more ridge gaps 38 do not necessarily have to be aligned to provide one or more corresponding radial channels 40 in every embodiment of the welding electrode 10. For instance, one or more circumferentially spaced apart ridge gaps 38 defined in the discontinuous ringed ridges 301, 302, 303, 304 may be positioned out of radial alignment with each other.

The circumferentially spaced apart arcuate ridge portions 36 of each discontinuous ringed ridge 301, 302, 303, 304 may define between three and six ridge gaps 38, and, in turn, the three to six ridge gaps 38 of each ridge 301, 302, 303, 304 may be aligned to provide three to six radial channels 40. The gaps 38 In the embodiment shown here in FIG. 2, the circumferentially spaced apart arcuate ridge portions 36 of each discontinuous ringed ridge 301, 302, 303, 304 define four ridge gaps 38. And those four ridge gaps 38 of each ridge 301, 302, 303, 304 are aligned with the four ridge gaps 38 of the other ridges 301, 302, 303, 304 to provide four radial channels 40 that are equidistantly spaced apart around the central weld face axis 24 at 90° intervals. Each of the four channels 40 has a width between opposed ends of the arcuate ridge portions 36 that provide the channel 40. This width may be constant, as shown in FIG. 2, or in other embodiments it may increase towards the outer peripheral portion 34 of the base weld face surface 22.

The arcuate ridge portions 36 of each discontinuous ringed ridge 301, 302, 303, 304 have arc lengths 42 extending along their respective circular base lines 311, 312, 313, 314 and ridge heights 44 extending above and normal to the base weld face surface 22. As between the several discontinuous ringed ridges 301, 302, 303, 304, the arc lengths of the arcuate ridge portions 36 increase with each ridge 301, 302, 303, 304 when progressing radially outwardly from the innermost discontinuous ringed ridge 301 to the outermost discontinuous ringed ridge 304 due to the increase in the circumference of ridges 301, 302, 303, 304. The ridge height of each of the arcuate ridge portions 36 in each discontinuous ringed ridge 301, 302, 303, 304 is generally not dependent on the location of the ridge 301, 302, 303, 304. The ridge height of each arcuate ridge portion 36 in each discontinuous ringed ridge 301, 302, 303, 304 may be constant along its arc length 42 and may, for example, range from 20 µm to 400 µm, or more narrowly from 50 µm to 300 µm, when measured normal to the base weld face surface 22. And, as for the radial spacing of the arcuate ridge portions 36, the ridge portions 36 of adjacent discontinuous ringed ridges 301, 302, 303, 304 are radially spaced apart from each other by a distance of 50 µm to 1800 µm, or more narrowly 80 µm to 1500 µm, along the base weld face surface 22.

The weld face 14 and its plurality of ringed ridges, at least one and preferably at least two of which are discontinuous, may be formed in any suitable manner. For example, in one implementation, the convex base weld face surface 22 may be formed with a plurality of continuous ringed ridges with a cutting tool such as the ones disclosed in U.S. Pat. No. 8,833,215 and US 2017/0225262. In particular, the cutting tool may include one or more cutting blades that are configured to shear the convex base weld face surface 22 to its desired convex contour and, in the process, form the plurality of continuous ringed ridges when a weld face of a stock electrode and the cutting blade(s) are in pressed engagement and rotated relative to one another about the central weld face axis 24. Then, once the plurality of continuous ringed ridges has been formed, portions of the continuous ringed ridges that are intended to serve as discontinuous ringed ridges may be scraped away, machined away, forged away, or otherwise removed or flattened in height to create the ridge gaps 38 and the arcuate ridges portions 36 along with the radial channels 40 that embody the discontinuous ringed ridges.

Figure 4:
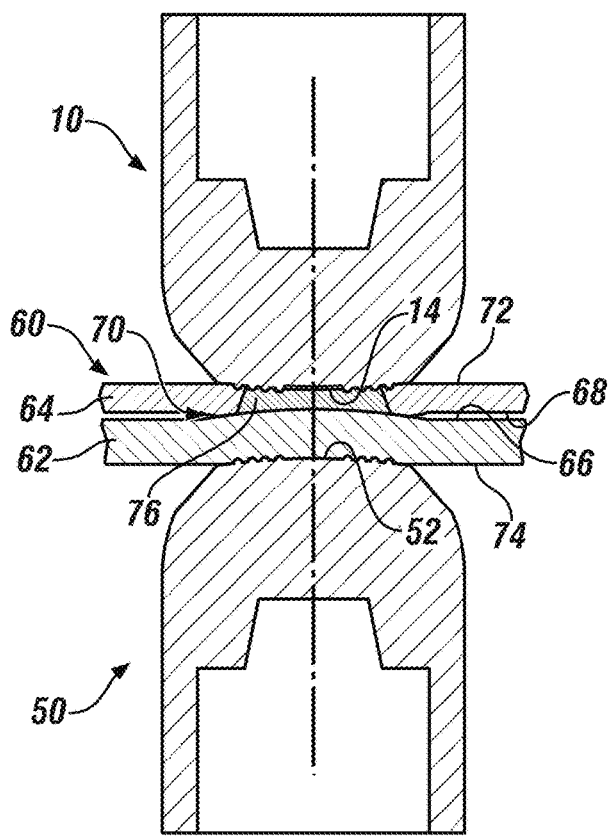
FIG. 4 is an elevated perspective view of the welding electrode illustrated in FIGS. 1-3 being used in conjunction with another opposed welding electrode to resistance spot weld a workpiece stack-up that includes a steel workpiece and an adjacent overlapping aluminum workpiece.

The welding electrode 10 having at least two discontinuous ringed ridges on the weld face 14 may be used to weld several different types of workpiece stack-ups. Referring now to FIG. 4, the welding electrode 10 and another opposed welding electrode 50 may be used to pass an electric current through a workpiece stack-up 60 that includes a steel workpiece 62 and an adjacent overlapping aluminum workpiece 64. The adjacent steel and aluminum workpieces 62, 64 include confronting faying surfaces 66, 68 that establish a faying interface 70. Additionally, and while not shown here, one or more additional steel workpieces may be disposed outboard and adjacent to the steel workpiece 62 (i.e., on the other side of the steel workpiece 62 from the aluminum workpiece 64), and one or more additional aluminum workpieces may be disposed outboard and adjacent to the aluminum workpiece 64 (i.e., on the other side of the aluminum workpiece 64 from the steel workpiece 62). For example, the workpiece stack-up 60 could be a "2T" steel-aluminum stack-up as shown or, in other embodiments, it may be a steel-steel-aluminum stack-up, a steel-aluminum-aluminum stack-up, a steel-steel-aluminum-aluminum stack-up, a steel-steel-steel-aluminum stack-up, or a steel-aluminum-aluminum-aluminum stack-up.

During welding of the workpiece stack-up 60, the weld face 14 of the disclosed welding electrode 10 is pressed against an aluminum side 72 of the stack-up 60, and a weld face 52 of the other, opposed welding electrode 50 is pressed against a steel side 74 of the stack-up 60 in facial alignment with the weld face 14 of the disclosed welding electrode 10. An electric current is then passed between the two aligned weld faces 14, 52 and through the workpiece stack-up 60. Resistance to the flow of the electric current rapidly heats up the more thermally and electrically resistive steel workpiece 62 and causes the aluminum workpiece 64 to melt. The molten aluminum weld pool created in the aluminum workpiece 64 wets the adjacent faying surface 66 of the steel workpiece and, upon termination of current flow, solidifies into a weld joint 76 that bonds the adjacent steel and aluminum workpieces 62, 64 together. As the steel workpiece 62 does not melt during the welding process, and thus the faying interface 70 of the workpieces 62, 654 is not consumed, the weld joint 76 extends from the faying surface 66 of the steel workpiece 62 up into the aluminum workpiece 64, typically with an inward taper as the joint moves farther away from the steel workpiece 62.

The weld face 14 of the disclosed welding electrode 10 along with its at least two discontinuous ringed ridges helps to form a more structurally sound weld joint 76 under certain circumstances. In particular, if all of the plurality of ringed ridges 30 on the weld face 14 are continuous, and thus uninterrupted along their circumferences, there is a possibility that the taller ringed ridges may heat the molten aluminum weld pool to a greater extent than the annular portions of the base weld face surface located between the ringed ridges. This, in turn, may result in the corresponding annular portions of the resultant weld joint 76 being more susceptible to cracking compared to the portions of the weld joint 76 that correspond to the positions of the continuous ringed ridges. In addition, deep continuous grooves formed within the aluminum workpiece 64 may, depending on the loading condition, act as favorable crack paths on their own. As such, cracks may propagate continuously around and within those annular crack-susceptible regions when the weld joint 76 is subjected to loading, which can adversely impact the strength of the joint 76. The inclusion of the at least two discontinuous ringed ridges on the weld face 14 of the disclosed welding electrode 10 mitigates this cracking issue. Notably, the radial channels 40 provided by the discontinuous ringed ridges produce corresponding radial raised portions in the weld joint 76, i.e., locations with greater thickness, that disrupt the crack-susceptible regions that may develop and deflect any cracking that it may encounter.

Figure 5:
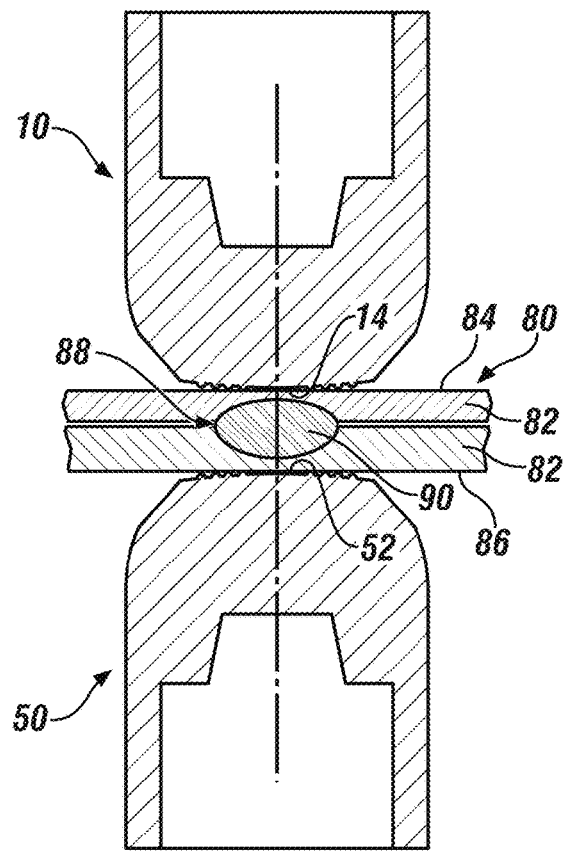
FIG. 5 is an elevated perspective view of the welding electrode illustrated in FIGS. 1-3 being used in conjunction with another opposed welding electrode to resistance spot weld a workpiece stack-up that includes a plurality of overlapping aluminum workpieces.

The welding electrode 10 may be used to resistance spot weld other workpiece stack-ups besides the ones represented in FIG. 4. For instance, and referring now to FIG. 5, the welding electrode 10 and the other opposed welding electrode 50 may be also used to pass an electric current through a workpiece stack-up 80 that includes a plurality (typically two to four) of overlapping aluminum workpieces 82. During welding of the workpiece stack-up 80, the weld face 14 of the disclosed welding electrode 10 is pressed one side 84 of the stack-up 80, and the weld face 52 of the other, opposed welding electrode 50 is pressed against another side 86 of the stack-up 80 in facial alignment with the weld face 14 of the disclosed welding electrode 10. An electric current is then passed between the two aligned weld faces 14, 52 and through the workpiece stack-up 80. Resistance to the flow of the electric current causes a molten aluminum weld pool to form. The molten aluminum weld pool consumes each faying interface 88 established between aluminum workpieces 82 within the stack-up 80 and, thus, penetrates into or through all of the overlapping aluminum workpieces 82. Upon termination of current flow, the aluminum weld pool solidifies into a weld nugget 90 that fusion welds the aluminum workpieces 82 together. The construction of the weld face 14 of the disclosed welding electrode 10 can have the same effect on the weld nugget 90 as it does on the weld joint 76 described above.

Figure 6:
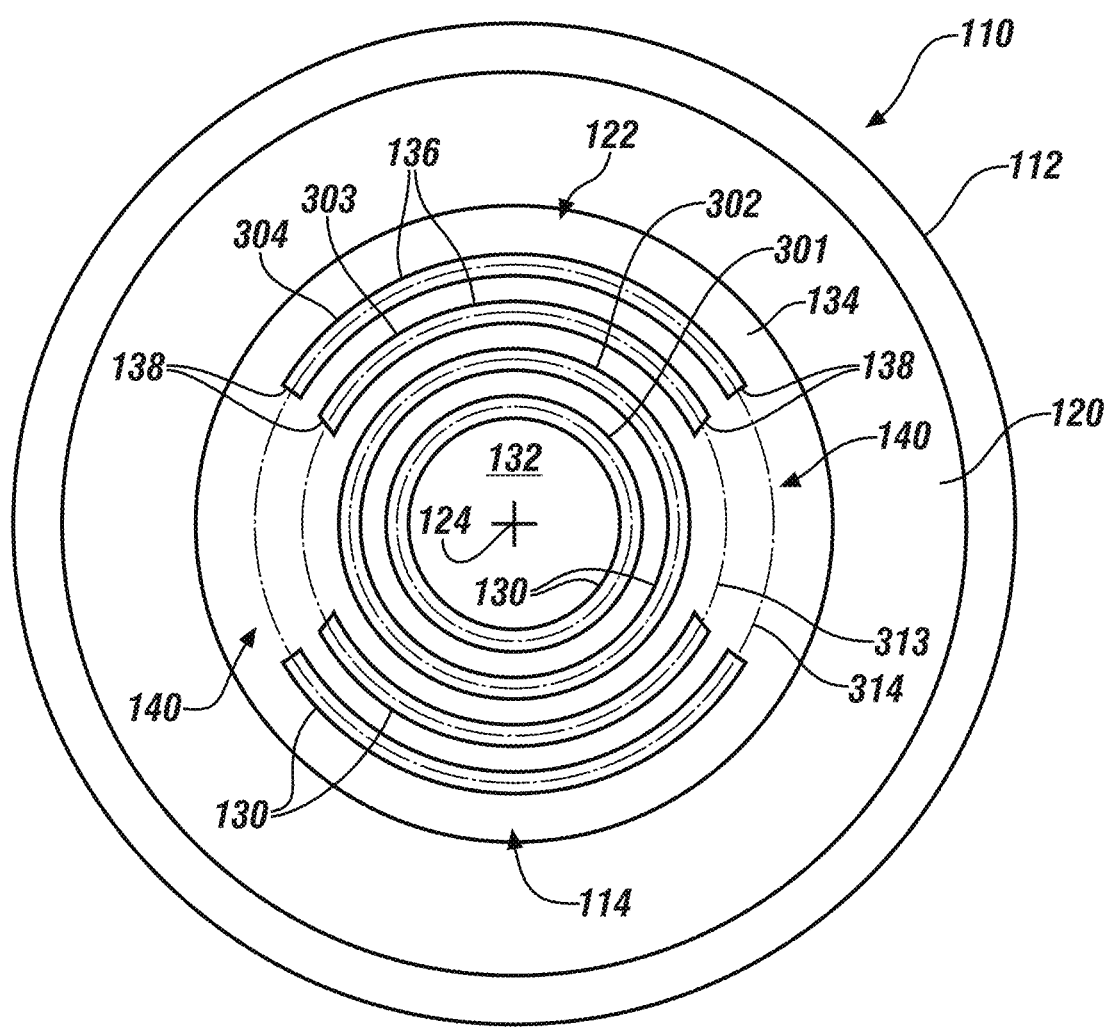
FIG. 6 is a plan view of the weld face of the welding electrode illustrated in FIG. 1-3 according to another embodiment of the present disclosure.

Another embodiment of the welding electrode of the present disclosure is illustrated in FIG. 6. The welding electrode 110 of this embodiment includes all of the structure and features of the welding electrode 10 described above except that the at least two discontinuous ringed ridges are different. Here, in this embodiment, the arcuate ridge portions 136 of the discontinuous ringed ridges define ridge gaps 138 that provide the radial channels 140 with an increasing width towards the outer peripheral portion 134 of the base weld face surface 122. The radial channels 140 may be semicircular, elliptical, triangular, etc. in plan view and open towards the peripheral portion 134 of the base weld face surface 122 and, additionally, as shown, may be diametrically opposed to each other on the weld face 114. Moreover, the plurality of ringed ridges 30 may include one or more continuous ringed ridges located on the base weld face surface 122 radially inside of the two or more discontinuous ringed ridges. To that end, the discontinuous ringed ridges may be the outermost ringed ridges 304 and the ringed ridge located radially inwardly adjacent to the outermost ringed ridge 304 (ridge 303 in FIG. 6), while the other ringed ridges (ridges 301 and 302 in FIG. 6) may be continuous.

The construction of the weld face 114 of the disclosed welding electrode 110 can have the same effect on the weld joint 76 and the nugget 90 described above. This particular weld face 114 construction may also induce the formation of asymmetric weld joints and weld nuggets since the diametrically opposed semicircular radial channels 140 will deliver maximum heat to the molten aluminum weld pool in those areas and cause the weld pool to grow laterally more quickly beneath the channels 140. The weld joint 76 or weld nugget 90 that solidifies from the molten aluminum weld pool will likewise have a first planar dimension and a second planar dimension when sectioned parallel to the planes of the workpieces 62, 64 or 82 where it has the greatest diameter and viewed in two-dimensions from above. The sectioning the weld joint 76 depicted in FIG. 4 would occur at the interface of the joint 76 and the faying surface 66 of the steel workpiece 62, and the sectioning the weld nugget 90 depicted in FIG. 5 would occur at its center. In either case, the first and second planar dimensions of the sectioned joint/nugget 76, 90 would not be equal as a result of the weld joint/nugget 76, 90 being skewed proportionally to and in the direction of the semicircular radial channels 140 defined by the at least two discontinuous ringed ridges on the weld face 114 of the disclosed welding electrode 110.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A welding electrode comprising:
   a body; and
   a weld face disposed at one end of the body, the weld face including a convex base weld face surface that rises upwardly along a central weld face axis and a plurality of ringed ridges that are radially spaced apart on the base weld face surface and surround the central weld face axis, the plurality of ringed ridges including an innermost ringed ridge and an outermost ringed ridge, the innermost ringed ridge being located closest to the central weld face axis and rising above a central portion of the base weld face surface, and the outermost ringed ridge being located farthest from the central weld face axis and rising above an outer peripheral portion of the base weld face surface;

wherein at least two of the plurality of ringed ridges that are located radially adjacent to one another are discontinuous ringed ridges, each of the discontinuous ringed ridges comprising a plurality of circumferentially spaced apart arcuate ridge portions that extend along a circular base line of the ridge and rise upwardly from the base weld face surface, wherein the circumferentially spaced apart arcuate ridge portions of each of the discontinuous ringed ridges define two or more ridge gaps along the circular base line of each discontinuous ringed ridge, and wherein the two or more ridge gaps defined in each of the discontinuous ringed ridges are aligned with the two or more ridge gaps defined in the other of the discontinuous ringed ridges to provide two or more radial channels that traverse the discontinuous ringed ridges.

2. The welding electrode set forth in claim 1, wherein the outermost ringed ridge and a ringed ridge located radially inwardly adjacent to the outermost ringed ridge are discontinuous ringed ridges.

3. The welding electrode set forth in claim 2, wherein all of the plurality of ringed ridges included on the weld face are discontinuous ringed ridges, and wherein each of the two or more radial channels provided by the aligned ridge gaps of the plurality of discontinuous ringed ridges communicates with the central portion of the base weld face surface and the outer peripheral portion of the base weld face surface.

4. The welding electrode set forth in claim 3, wherein the arcuate ridge portions of the plurality of discontinuous ringed ridges define ridge gaps that provide each of the two or more radial channels with a constant width.

5. The welding electrode set forth in claim 3, wherein the arcuate ridge portions of each of the discontinuous ringed ridges defines three to six ridge gaps that are aligned to provide three to six radial channels.

6. The welding electrode set forth in claim 3, wherein the plurality of discontinuous ringed ridges has from two to ten discontinuous ringed ridges.

7. The welding electrode set forth in claim 6, wherein the plurality of discontinuous ringed ridges has from three to six discontinuous ringed ridges.

8. The welding electrode set forth in claim 1, wherein the ridge portions of each of the discontinuous ringed ridges have ridge heights that range from 20 μm to 400 μm.

9. The welding electrode set forth in claim 1, wherein each of the plurality of ringed ridges is separated from its adjacent ringed ridge(s) by a distance of 50 μm to 1800 μm.

10. The welding electrode set forth in claim 1, wherein the plurality of ringed ridges includes at least one continuous ringed ridge in addition to the at least two discontinuous ringed ridges, each of the at least one continuous ringed ridge rising upwardly from the base weld face surface and being uninterrupted along its circumference.

11. The welding electrode set forth in claim 1, wherein the arcuate ridge portions of the plurality of discontinuous ringed ridges define ridge gaps that provide each of the two or more radial channels with an increasing width towards the outer peripheral portion of the base weld face surface.

12. The welding electrode set forth in claim 11, wherein the two or more radial channels with an increasing width towards the outer peripheral portion of the base weld face surface are semicircular.

13. The welding electrode set forth in claim 11, wherein one or more continuous ringed ridges are located on the base weld face surface radially inside of the plurality of discontinuous ringed ridges.

14. The welding electrode set forth in claim 11, wherein the radial channels with an increasing width towards the outer peripheral portion of the base weld face surface includes two radial channels open to the peripheral portion of the base weld face surface, the two radial channels being diametrically opposed to each other.

15. A welding electrode comprising:
a body; and
a weld face disposed at one end of the body, the weld face including a convex base weld face surface that rises upwardly along a central weld face axis and a plurality of ringed ridges that are radially spaced apart on the base weld face surface and surround the central weld face axis, the plurality of ringed ridges including an innermost ringed ridge and an outermost ringed ridge, the innermost ringed ridge being located closest to the central weld face axis and rising above a central portion of the base weld face surface, and the outermost ringed ridge being located farthest from the central weld face axis and rising above an outer peripheral portion of the base weld face surface, and wherein at least one of the plurality of ringed ridges is a discontinuous ringed ridge that has a plurality of arcuate ridge portions that define one or more circumferentially spaced apart ridge gaps.

* * * * *